Dec. 15, 1953  M. E. LEE  2,662,699
FISHING REEL
Filed April 27, 1950
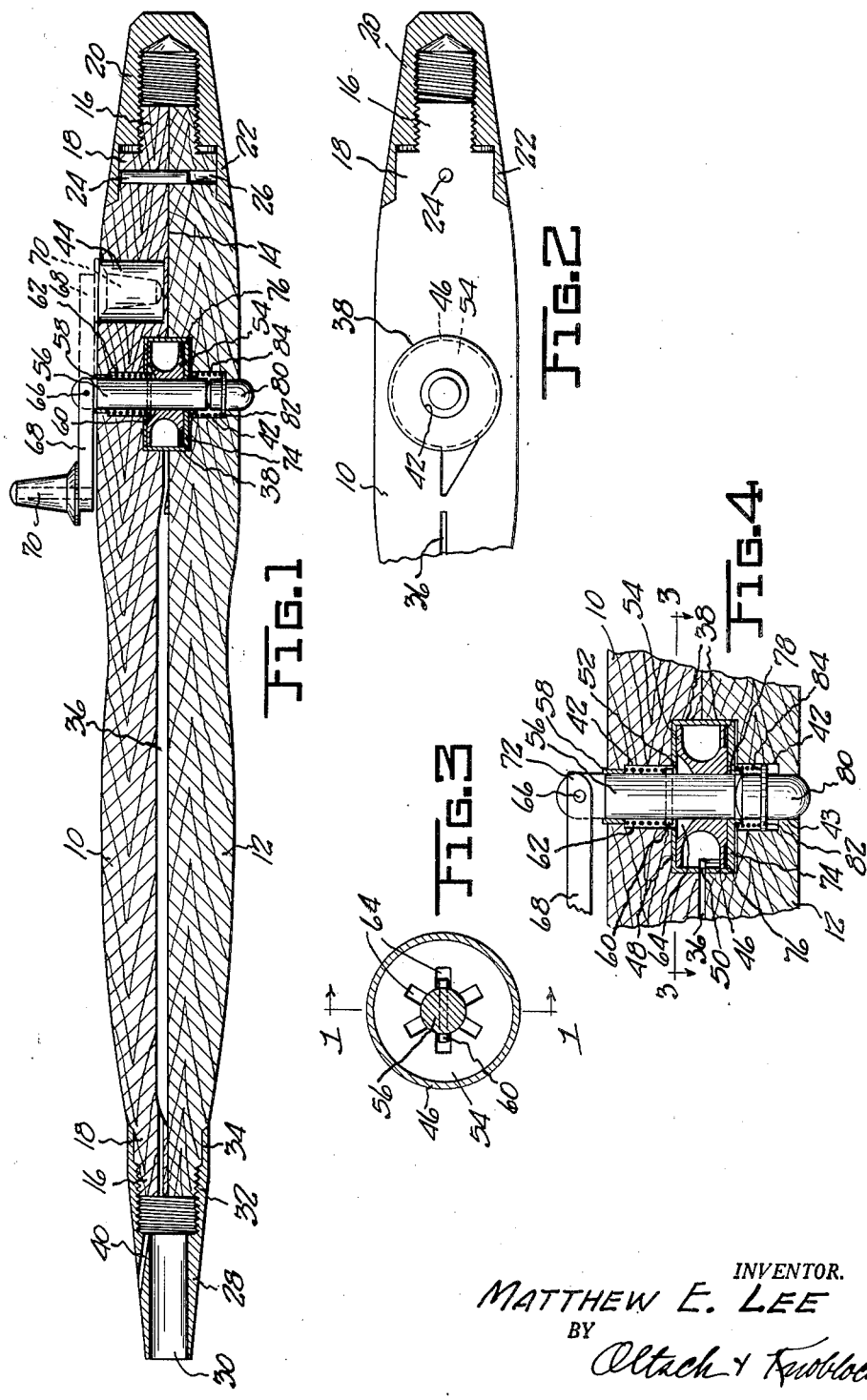
INVENTOR.
MATTHEW E. LEE
BY
Oltsch & Knoblock
ATTORNEYS Patented Dec. 15, 1953

2,662,699

UNITED STATES PATENT OFFICE 2,662,699

FISHING REEL

Matthew E. Lee, South Bend, Ind.

Application April 27, 1950, Serial No. 158,577

1 Claim. (Cl. 242—84.7)

1

This invention relates to fishing reels, and more particularly to a fishing reel of the character adapted to be mounted within and confined by the longitudinally split handle of a fishing rod, such as the type shown in my copending application, Serial No. 47,095, filed August 31, 1948, now Patent No. 2,640,661.

In the assembly of longitudinally split fishing rod handles having transverse passages to receive a reel, considerable difficulty is experienced in assembling the parts in a manner to insure free running of the reel. Where the journals for the shaft of the reel are carried by the separate parts of a split handle, any small axial disalignment of those journals will cause a binding action preventing free running of the shaft. Regardless of the care with which the handle parts are assembled, absolute accuracy of registration of the journals is not always possible and, where inaccuracies occur, it is not possible to detect them during assembly, so that the only assurance of proper operation of the device which can be obtained cannot be secured until after the complete unit has been assembled.

It is the primary object of this invention to overcome this difficulty and to provide means insuring in all instances complete accuracy of positioning of the journals for the shaft of the reel which project from said reel and at least one end of which projects from the rod handle mounting the reel.

A further object is to provide a reel assembly having a reel housing, a spool confined in said housing, and a shaft rotatable and slidable in said spool housing, wherein one end of said shaft is journaled in a bearing carried by one handle part and the opposite end of said shaft is journaled in an aperture of said housing, said housing being separable and provided with means for accurately registering the parts thereof when assembled.

Other objects will be apparent from the following specification.

In the drawing:

Fig. 1 is a longitudinal sectional view of an assembled rod handle and reel, taken on line 1—1 of Fig. 3.

Fig. 2 is a fragmentary inner face view illustrating the construction of one part of a rod handle.

Fig. 3 is a detail sectional view taken on line 3—3 of Fig. 4.

Fig. 4 is an enlarged fragmentary sectional view similar to Fig. 1 and illustrating the parts of the reel in a different position.

2

Referring to the drawing which illustrates the preferred embodiment of the invention, the numerals 10 and 12 designate complementary parts of a longitudinally split fishing rod handle having a central longitudinal parting plane 14. The opposite end portions of the handle parts have cooperating reduced dimension externally screw-threaded portions 16 and intermediate shouldered or stepped portions 18.

At one end the handle parts are fixedly secured together in register by an internally screw-threaded end cap 20 having a central internally screw-threaded bore meshing with the threads of the handle part 16 and having a skirt portion 22 encircling the handle portions 18. A transverse pin 24 is carried by one of the handle parts, such as the handle part 10, and is adapted to have a snug fit within a transverse bore 26 in the opposite handle part. The fit of the pin 24 in the bore 26 cooperates with the cap 20, 22 to hold the parts in complementary relation.

A sleeve 28 having a bore 30 adapted to receive the shank portion of a fishing rod or blade (not shown) has a screw-threaded bore portion 32 fitting upon the threaded end portion 16 of the handle. The inner end of the sleeve 28 includes a skirt portion 34 fitting around the handle portions 18.

An elongated central line passage 36, preferably open at the parting face of one of the handle parts, extends longitudinally of the handle from a transverse socket or recess 38 positioned intermediate the length of the handle. The passage 36 extends to the end of the handle mounting the sleeve 28, and said sleeve is preferably provided with a diagonal bore 40 formed therein to discharge a line passing from the passage 36 and thence laterally forwardly and outwardly through the passage 40. The socket portions 38 are formed in each of the two confronting handle parts so as to provide cooperatively a socket which is intersected by the parting plane 14 and whose axis is perpendicular to said parting plane. Reduced outer passage portions 42 are axially aligned with the sockets 38 and cooperate therewith to provide a passage extending continuously through the assembled handle. In longitudinally spaced relation to this passage there is formed in one of the handle parts, here shown as handle part 10, a transverse recess 44, for purposes to be mentioned hereinafter.

My new reel assembly is adapted to be mounted in the handle constructed as defined above. The reel includes a cup-shaped housing part fitting within the central socket 38 and having a cylindrical wall 46 and an end wall 48. The cylindrical wall 46 is provided with a lateral opening or passage 50 in communication with the line passage 36 and adapted for entry of line into the cup-shaped housing. The end wall 48 of the cup-shaped housing has a central aperture 52 formed therein. A line spool 54 is snugly and rotatably fitted within the cup-shaped housing 46, 48 and has a perimetral dimension only slightly less than the inner diameter of the cylindrical wall 46 so as to provide a clearance between said parts substantially less than the thickness of a line but yet sufficient to permit free rotation of the spool within the housing. A plastic line (not shown) is preferred.

The spool 54 has an axial bore within which is rotatably and slidably received an elongated shaft 56 which projects from the opposite ends of the socket 38 in the normal position of the parts, as best illustrated in Fig. 1, said shaft also projecting freely with clearance through the aperture 52 in the base 40 of the reel housing. A sleeve 58 is mounted within the outer end of the reduced passage portion 42 of handle part 10 and serves to journal the shaft 56 at one end portion thereof. As here illustrated, the sleeve 58 preferably projects slightly beyond the outline of the handle so that its outer end provides a bearing surface. The shaft 56 intermediate its ends mounts a cross-pin 60 which is free to slide within the reduced passage portion 42. A coil spring 62 encircles the shaft 56, bearing at its outer end upon the journal sleeve 58 and at its inner end upon the cross-pin 60. The cross-pin 60 is adapted to enter with clearance the opening 52 in the end wall 48 of the housing and is adapted to be received in radial recesses 64 formed in the end of the spool. The normal position of the parts is illustrated in Fig. 1, wherein the pin 60 is seated in spool recesses 64 by the pressure of the spring 62 so that a rotation transmitting drive connection exists between the shaft and the spool.

A portion of the shaft 56 projects outwardly from the bearing sleeve 58 and has pivoted thereto at 66 one end of a crank arm 68 whose opposite end rotatably mounts a crank handle 70. The spring 62 in serving to draw the shaft 56 inwardly to lock the same to the spool, also serves to press the crank arm 68 against the outer end of the bearing 58 to provide a bearing surface therefor, and, furthermore, serves to resist pivoting of the crank arm 68 when, as here illustrated in Fig. 4, a nose portion 72 is formed on the pivoted end of the arm 68. Thus when it is desired intentionally to place the handle 70 in a retracted position, as when the unit is being stored, it may be swung to the position illustrated in dotted lines in Fig. 1 with the crank handle 70 entering the recess 44. This prevents rotation of the shaft or feeding of the line, and the same action of the spring 62 which serves normally to hold the crank arm in the Fig. 1 full line position, serves also to hold it releasably in the dotted line position.

The cup-shaped housing 46, 48 forms one part only of a separable housing which completely encases the spool 54. A second housing part fits upon the cup-shaped housing and is provided with means for accurately centering it upon the part 46, 48. As here illustrated, the second housing part constitutes a closure plate 74 which spans the open end of the cylindrical wall portion 46 and has a circumferential reduced thickness portion 76 of such construction that it defines a cylindrical shoulder having a snug centering fit within the open end of the cylindrical housing wall 46 and a reduced thickness flange bearing against the outer edge of said cylindrical housing wall 46. The plate 74 is therefore positioned entirely with respect to the housing 46, 48 and is not dependent for accuracy of position upon the position of the handle part, such as the part 12, within which it is confined. The plate 74 has a central aperture 78 of a diameter to journal and slidably receive the shaft 56. In the normal position of the parts, as seen in Fig. 1, the shaft 56 projects through said aperture 78 and into the reduced passage portion 42 of the handle part 12.

The passage 42 in the handle part 12 is stepped and has a reduced outer end portion 43. A cylindrical push button 80 of elongated construction is slidable in the passage portion 43 and normally projects outwardly therefrom. At a point intermediate its ends the member 80 has a circumferential flange 82 which is normally adapted to bear against the shoulder formed between the passage portions 42 and 43. A coil spring 84 encircles the inner end portion of the plunger 80 and bears against the flange 82 to press the plunger 80 to the Fig. 1 position. This coil spring is preferably welded, soldered or otherwise fixedly secured to the housing plate 74 so as to facilitate the accurate assembly of the parts during the assembly of the rod and reel.

It will be apparent that this reel construction insures full accuracy of registration of the journals for the opposite ends of the shaft so that the reel will have a free running or free spinning action at all times. The reel also is readily assembled within the handle, for which purpose it will be evident that the entire reel may be assembled and connected to the handle part 10 previous to the positioning of the push button 80 by the coil spring 84, whereupon the opposite handle part 12 may be applied thereto and assembled or secured to the handle part 10 by means of the end caps 20 and 28.

The passage 50 may be L-shaped, opening at the mouth of the cup-shaped housing to facilitate insertion of the reel and the line into that housing. The L shape of the passage is best seen in Fig. 3. The shape of this passage forms a tongue in the housing wall, but, inasmuch as the housing fits snugly within a recess or socket in the handle, and further, inasmuch as the reel fits snugly within the housing, these parts mutually reinforce the arrangement including the tab and avoids excessive weakness of the structure due to the presence of the tab.

While the preferred embodiment of the invention has been illustrated and described herein, it will be understood that changes in the construction may be made within the scope of the appended claim without departing from the spirit of the invention.

I claim:

A fishing reel adapted to be mounted in a transverse passage extending through a longitudinally split fishing rod handle, comprising a cup-shaped housing having an end wall provided with a central aperture and having a lateral line-feeding aperture, an elongated shaft concentric with said housing and extending therethrough with its ends projecting therefrom, a spool rotatable in said housing with slight clearance and journaled and slidable on said shaft, one end wall of said spool being notched, a cross-pin carried by said shaft and adapted to seat in a notch, a sleeve encircling one end of said shaft and adapted to fit in one end of said handle passage spaced from said housing to journal said shaft, a coil spring encircling said shaft and bearing at opposite ends against said sleeve and said cross-pin, and a cover spanning the open end of said housing and having a central aperture journaling said shaft, said cover having a reduced thickness marginal portion defining a shoulder portion projecting into said housing with a snug fit to center said cover, a push button shiftable in said handle passage adjacent to and engageable with one end of said shaft and having a circumferential flange between its ends, and a coil spring fixedly secured at one end to said cover and encircling the portion of said button inwardly of said flange.

MATTHEW E. LEE.

References Cited in the file of this patent

UNITED STATES PATENTS

| Number | Name | Date |
|---|---|---|
| 227,000 | Hancock | Apr. 27, 1880 |
| 412,629 | Kepler | Oct. 8, 1889 |
| 792,910 | Meisselbach et al. | June 20, 1905 |
| 1,744,461 | Foss | Jan. 21, 1930 |
| 2,152,969 | Nash | Apr. 14, 1939 |
| 2,252,054 | Welch | Aug. 12, 1941 |
| 2,454,529 | Thompson | Nov. 23, 1948 |
| 2,573,240 | Berlinger | Oct. 30, 1951 |